(12) United States Patent
Jaffe

(10) Patent No.: US 7,398,236 B2
(45) Date of Patent: Jul. 8, 2008

(54) METHOD AND MEDIUM FOR BUDGETING

(75) Inventor: Max Jaffe, 4123 La Place Dr., Dallas, Dallas County, TX (US) 75220-5041

(73) Assignee: Max Jaffe, Dallas, TX (US)

( * ) Notice: Subject to any disclaimer, the term of this patent is extended or adjusted under 35 U.S.C. 154(b) by 1377 days.

(21) Appl. No.: 09/846,171

(22) Filed: Apr. 30, 2001

(65) Prior Publication Data
US 2002/0161678 A1   Oct. 31, 2002

(51) Int. Cl.
*G06Q 40/00*   (2006.01)
(52) U.S. Cl. .......................... 705/35; 705/39
(58) Field of Classification Search .......... 705/35, 705/39
See application file for complete search history.

(56) References Cited

U.S. PATENT DOCUMENTS

| | | | |
|---|---|---|---|
| 5,882,041 A | 3/1999 | Schara | 283/66.1 |
| 5,903,881 A | 5/1999 | Schrader et al. | 705/42 |
| 5,947,526 A | 9/1999 | Neu | 283/66.1 |
| 6,014,648 A | 1/2000 | Brennan | 705/41 |
| 6,128,603 A | 10/2000 | Dent et al. | 705/40 |
| 6,378,905 B1 | 4/2002 | Neu | 283/66.1 |
| 7,130,822 B1 * | 10/2006 | Their et al. | 705/35 |
| 2001/0039521 A1 * | 11/2001 | Mattson et al. | 705/30 |
| 2004/0254835 A1 * | 12/2004 | Thomas et al. | 705/14 |

OTHER PUBLICATIONS

Linden, Tom; ; Money matters Macworld v10n6 pp. 119-125 Jun. 1993.*
Tax Freedom Day News Conference, Apr. 12, 1993.*
"The BudgetMap—The Simpler Way to Budget"—Advertisement for "BudgetMap" at the Internet website http://www.budgetmap.com/_dated Sep. 6, 2002, 13 pages.

* cited by examiner

*Primary Examiner*—Jagdish N Patel
(74) *Attorney, Agent, or Firm*—Gardere Wynne Sewell LLP

(57) ABSTRACT

A method and system for budgeting is provided that includes determining a funds total from at least an income amount. The method further provides for budgeting, comprising creating a worksheet including an arrangement of a funds total, an expenditure, a maximizable cost, and a cumulative cost; determining the funds total from at least an income amount; identifying the expenditure representing an amount owed; classifying the expenditure as one of a category of a plurality of categories; computing the maximizable cost associated with the expenditure; generating the cumulative cost associated with the category of the plurality of categories; updating the worksheet; and updating the income amount.

25 Claims, 9 Drawing Sheets

FIG. 1

| | | | | | | |
|---|---|---|---|---|---|---|
| | SPENDING SOLUTION MADE SOLELY FOR:<br>MR. JOHN SMYTH | | | | | |
| | FOR THE MONTH: APRIL, 2001<br>AT APRIL 1, 2001 ~31 | | | | | |
| EXPENSES /12 | 30 | 34 | 46 | REVENUES/FUNDS 14 | | |
| | AG | H2O | AU | | | FE |
| SAVE /22 16/$1,000.00 | 23.81 HRS | $4,000.00 | BANK /110 | | | $5,370.00 |
| CREDIT CARD 32 | | 630.00 | LESS: MINIMUM | | | |
| MORTGAGE 18~1200 | 28.57 HRS | 1,200.00 | BALANCE | | | (1,500.00) |
| HOMEOWNERS DUES 200 | 4.76 HRS | 200.00 ~48 | | | | |
| ELECTRICITY 20 150 | 3.57 HRS | 190.00 /52 | 112 | | | |
| PHONE ~50 52/60 | 1.43 HRS | 60.00 | AVAILABLE | | | |
| WATER 30 | 0.71 HRS | 30.00 | BANK BALANCE | | | $3,870.00 |
| ⊟ HOME INSURANCE 100 | 2.38 HRS | 300.00 | | | | |
| CABLE TELEVISION 50 | 1.19 HRS | 50.00 | 100 | | | |
| INTERNET SERVICE 20 | 0.48 HRS | 20.00 | | | | |
| ⊟ TOLL COST 30 | 0.71 HRS | 40.00 | 4/15/2001 | | | |
| LAUNDRY /20 50 | 1.19 HRS /40 | 75.00 | PAYCHECK~102 | | | 3,500.00 |
| CAR PAYMENT 18~350 | 8.33 HRS | 350.00 | | | | |
| GAS /60 100 | 2.38 HRS | 130.00 | CASH ~104 | | | 50.00 |
| ⊟ CAR INSURANCE 62/100 | 2.38 HRS | 200.00 ~64 | | | | |
| ⊟ CAR MAINTENANCE 50 | 1.19 HRS | 200.00 | | | | |
| HEALTH CLUB 100 | 2.38 HRS | 100.00 | MONEY MARKET | | | 12,550.00 |
| HAIRCUT 25 | 0.60 HRS | 25.00 | 106 | | | |
| PRESCRIPTION 20 | 0.48 HRS | 20.00 | | | | |
| CHARITY 150 | 3.57 HRS | 220.00 | | | | |
| ⊟ VACATION /130 300 | 7.14 HRS | 600.00 | | | | |
| ENTERTAINMENT 500 | 11.90 HRS | 580.00 | | | | |
| CLOTHING ~70 72/100 | 2.38 HRS | 150.00 ~74 | | | | |
| PERSONAL CARE 100 | 2.38 HRS | 130.00 | | | | |
| ⊟ TUITION /130 1000 | 23.81 HRS | 9,000.00 | | | | |
| CHILD-ACTIVITIES 250 | 5.95 HRS | 240.00 | | | | |
| LUNCHES 200 | 4.76 HRS | 190.00 | | | | |
| GROCERIES 600 | 14.29 HRS | 640.00 | | | | |
| ETCETERAS 100 | 2.38 HRS | 110.00 | | | | |
| TOTAL $6,935.00 | 165.12 HRS | $19,680.00 | TOTAL 114/ | | | $19,970.00 |
| 90 | 92 | 94 | | | | |

114~ TOTAL CURRENT FUNDS     $19,970.00
94 / TOTAL ACCRUED UNSPENT     ($19,680.00)

120 / NET CUSHION (DEFICIT)     $290.00

⊟ THIS ITEM IS A NON-MONTHLY EXPENDITURE

HOUSING COSTS (MONTHLY)*

1) MORTGAGE OR RENT ⟋154    $_____
2) REAL ESTATE TAXES          $_____
3) INSURANCE                  $_____
4) HOMEOWNERS ASSOCIATION DUES $_____
5) ELECTRICITY                $_____
6) CABLE                      $_____
7) TELEPHONE                  $_____
8) GAS                        $_____
9) WATER AND GARBAGE COLLECTION $_____
10) LANDSCAPING               $_____
11) MAINTENANCE AND REPAIRS   $_____
12) EXTERMINATOR              $_____
13) FURNITURE                 $_____
14) OTHER                     $_____

TOTAL                         $_____ 152

YOUR PERSONAL "MAXIMIZABLE FACTOR"         42
FROM FIGURE SEVEN             $_____

TOTAL ABOVE DIVIDED BY YOUR                40
PERSONAL "MAXIMIZABLE FACTOR"    _____

THE LAST FIGURE IS THE NUMBER OF HOURS YOU HAVE TO WORK EACH MONTH IN ORDER TO MAINTAIN YOUR RESIDENCE.

*FOR ANY EXPENSES THAT ARE PAYABLE ANNUALLY, ACCRUE ONE-TWELFTH PER MONTH.

THE COST OF CHILDREN (MONTHLY)*

1) CHILD CARE ⟋172           $_____
2) EDUCATION                  $_____
3) EXTRA CURRICULAR ACTIVITIES $_____
4) ENTERTAINMENT              $_____
5) GIFTS AND CLOTHES          $_____
6) BIRTHDAY PARTIES           $_____
7) OTHER                      $_____

*FOR ANY EXPENSES THAT ARE PAYABLE ANNUALLY, ACCRUE ONE-TWELFTH PER MONTH.

FIG. 3

PERSONALITY COSTS (MONTHLY)*

I.     <u>AUTOMOBILE</u>

1) PAYMENT     — 162     $_____
2) GASOLINE     $_____
3) INSURANCE     $_____
4) MAINTENANCE     $_____
5) LICENSES, INSPECTION     $_____

II.     <u>CLOTHING</u>

1) PURCHASES     $_____
2) LAUNDRY     $_____

III.     <u>PERSONAL CARE</u>

1) HYGIENE ITEMS     $_____
2) HAIRCUTS, HAIR SUPPLIES     $_____
3) HEALTH CLUB     $_____
4) OTHER     $_____

IV.     <u>FOOD</u>

1) GROCERIES     $_____
2) TAKE HOME     $_____
3) DINING OUT     $_____
4) LUNCHES (AT WORK)     $_____
5) SNACKS     $_____

V.     <u>MEDICAL (NOT REIMBURSED BY INSURANCE)</u>

1) DOCTORS     $_____
2) DENTIST     $_____
3) PRESCRIPTION     $_____
4) OVER THE COUNTER SUPPLIES     $_____

VI.     <u>OTHER</u>

1) ENTERTAINMENT     $_____
2) CABLE TELEVISION     $_____
3) INTERNET SERVICE PROVIDER     $_____
4) PETS     $_____
5) CHARITABLE CONTRIBUTIONS     $_____
6) VACATIONS     $_____
7) DUES AND SUBSCRIPTIONS     $_____
8) PROFESSIONAL ASSOCIATION FEES     $_____
9) ETCETERAS     $_____

*FOR ANY EXPENSES THAT ARE PAYABLE ANNUALLY, ACCRUE ONE-TWELFTH PER MONTH.

YOUR MONTHLY SAVINGS AMOUNT

MONTHLY TAKE HOME PAY: ╱184      $_____
10% OF MONTHLY TAKE HOME PAY: ╱182      $_____
15% OF MONTHLY TAKE HOME PAY: ╲182      $_____
20% OF MONTHLY TAKE HOME PAY: ╲182      $_____

START SAVING WITH WHAT FEELS COMFORTABLE FOR YOU. EVENTUALLY, YOU WILL BE ABLE TO SAVE MORE, ONCE YOU LEARN HOW TO SPEND PROPERLY. IF YOU HAVE A HEAVY DEBT BURDEN, PART OF THE SAVINGS WILL BE USED TO PAY DOWN THE DEBT. EVENTUALLY YOU WILL SEE YOUR SAVINGS GROW. THEN YOU WILL INVEST YOUR SAVINGS AND SEE YOUR MONEY GROW.

FIG. 6

THE CONVENIENCE OF MONEY AND THE "ALTERNATIVE TO MONEY" (ATM)

EXERCISE:

WRITE DOWN AT LEAST FIVE ITEMS, AND THEIR COST, YOU PURCASED DURING THE PAST WEEK THAT WERE NOT ONLY UNNECESSARY, BUT ALSO NO LONGER IN YOUR POSSESSION. THE IRONY IS THAT THERE ARE UNDOUBTEDLY MANY THINGS IN THIS CATEGORY, YOU JUST CANNOT REMEMBER ALL OF THEM BECAUSE THEY ARE NOT THAT IMPORTANT! THAT CANDY BAR FROM THE VENDING MACHINE LAST WEDNESDAY WOULD BE A GREAT EXAMPLE.

ITEM #1 ╱192_____      $_____
ITEM #2_____      $_____
ITEM #3_____      $_____
ITEM #4_____      $_____
ITEM #5_____      $_____

TOTAL ╲194      $_____ x 52 WEEKS =

AN ANNUAL COST OF ╲196      $_____

CALCULATING YOUR "MAXIMIZABLE FACTOR"

202 — A = ANNUAL NET SALARY (TAKE-HOME PAY)
$ _____

B = NUMBER OF HOURS PER WEEK AT THE OFFICE _____ 204

C = NUMBER OF HOURS PER WEEK WORKING AT HOME _____ 206

D = NUMBER OF HOURS PER WEEK WORKING "ON THE ROAD" _____ 208

E = B+C+D _____ 210

F = NUMBER OF HOURS WORKED IN ONE YEAR = 52xE _____ 212

YOUR "MAXIMIZABLE FACTOR" = A DIVIDED BY F
(YOUR HOURLY RATE)

SPENDING SOLUTION MADE SOLELY FOR:
MR. JOHN SMYTH

FOR THE MONTH: APRIL, 2001
AT APRIL 2, 2001 — 220

| EXPENSES | AG | H2O | AU | REVENUES/FUNDS | FE |
|---|---|---|---|---|---|
| SAVE | 1000 | 23.81 HRS | $4,000.00 | BANK | $5,370.00 |
| CREDIT CARD — 224 |  |  | 650.00 | LESS: MINIMUM |  |
| MORTGAGE | 1200 | 28.57 HRS | 1,200.00 | BALANCE | (1,500.00) |
| HOMEOWNERS DUES | 200 | 4.76 HRS | 200.00 |  |  |
| ELECTRICITY | 150 | 3.57 HRS | 190.00 |  |  |
| PHONE | 60 | 1.43 HRS | 60.00 | AVAILABLE |  |
| WATER | 30 | 0.71 HRS | 30.00 | BANK BALANCE | $3,870.00 |
| ⊟ HOME INSURANCE | 100 | 2.38 HRS | 300.00 |  |  |
| CABLE TELEVISION | 50 | 1.19 HRS | 50.00 |  |  |
| INTERNET SERVICE — 222 | 20 | 0.48 HRS | 0.00 |  |  |
| ⊟ TOLL COST | 30 | 0.71 HRS | 40.00 | 4/15/2001 |  |
| LAUNDRY | 50 | 1.19 HRS | 75.00 | PAYCHECK | 3,500.00 |
| CAR PAYMENT | 350 | 8.33 HRS | 350.00 |  |  |
| GAS | 100 | 2.38 HRS | 130.00 | CASH | 50.00 |
| ⊟ CAR INSURANCE | 100 | 2.38 HRS | 200.00 |  |  |
| ⊟ CAR MAINTENANCE | 50 | 1.19 HRS | 200.00 |  |  |
| HEALTH CLUB | 100 | 2.38 HRS | 100.00 | MONEY MARKET | 12,550.00 |
| HAIRCUT | 25 | 0.60 HRS | 25.00 |  |  |
| PRESCRIPTION | 20 | 0.48 HRS | 20.00 |  |  |
| CHARITY | 150 | 3.57 HRS | 220.00 |  |  |
| ⊟ VACATION | 300 | 7.14 HRS | 600.00 |  |  |
| ENTERTAINMENT | 500 | 11.90 HRS | 580.00 |  |  |
| CLOTHING | 100 | 2.38 HRS | 150.00 |  |  |
| PERSONAL CARE | 100 | 2.38 HRS | 130.00 |  |  |
| ⊟ TUITION | 1000 | 23.81 HRS | 9,000.00 |  |  |
| CHILD-ACTIVITIES | 250 | 5.95 HRS | 240.00 |  |  |
| LUNCHES | 200 | 4.76 HRS | 190.00 |  |  |
| GROCERIES | 600 | 14.29 HRS | 640.00 |  |  |
| ETCETERAS | 100 | 2.38 HRS | 110.00 |  |  |
| TOTAL | $6,935.00 | 165.12 HRS | $19,680.00 | TOTAL | $19,970.00 |

94

TOTAL CURRENT FUNDS $19,970.00
TOTAL ACCRUED UNSPENT ($19,680.00)

NET CUSHION (DEFICIT) $290.00

⊟ THIS ITEM IS A NON-MONTHLY EXPENDITURE

FIG. 9

| SPENDING SOLUTION MADE SOLELY FOR: MR. JOHN SMYTH |||||
|---|---|---|---|---|
| FOR THE MONTH: APRIL, 2001 AT APRIL 3, 2001 — 230 |||||
| EXPENSES |||| REVENUES/FUNDS |
| | AG | H2O | AU 48 | FE |
| SAVE | 1000 | 23.81 HRS | $4,000.00 | BANK — 110 | $3,970.00 |
| CREDIT CARD | | | 650.00 | LESS: MINIMUM | |
| MORTGAGE — 232 | 1200 | 28.57 HRS | 0.00 | BALANCE | (1,500.00) |
| HOMEOWNERS DUES | 200 | 4.76 HRS | 0.00 | | |
| ELECTRICITY | 150 | 3.57 HRS | 190.00 | | |
| PHONE  234 | 60 | 1.43 HRS | 60.00 | AVAILABLE | |
| WATER | 30 | 0.71 HRS | 30.00 | BANK BALANCE | $2,470.00 |
| ⊟HOME INSURANCE | 100 | 2.38 HRS | 300.00 | | |
| CABLE TELEVISION | 50 | 1.19 HRS | 50.00 | | |
| INTERNET SERVICE | 20 | 0.48 HRS | 0.00 | | |
| ⊟TOLL COST | 30 | 0.71 HRS | 40.00 | 4/15/2001 | |
| LAUNDRY | 50 | 1.19 HRS | 75.00 | PAYCHECK | 3,500.00 |
| CAR PAYMENT | 350 | 8.33 HRS | 350.00 | | |
| GAS | 100 | 2.38 HRS | 130.00 | CASH | 50.00 |
| ⊟CAR INSURANCE | 100 | 2.38 HRS | 200.00 | | |
| ⊟CAR MAINTENANCE | 50 | 1.19 HRS | 200.00 | | |
| HEALTH CLUB | 100 | 2.38 HRS | 100.00 | MONEY MARKET | 12,550.00 |
| HAIRCUT | 25 | 0.60 HRS | 25.00 | | |
| PRESCRIPTION | 20 | 0.48 HRS | 20.00 | | |
| CHARITY | 150 | 3.57 HRS | 220.00 | | |
| ⊟VACATION | 300 | 7.14 HRS | 600.00 | | |
| ENTERTAINMENT | 500 | 11.90 HRS | 580.00 | | |
| CLOTHING | 100 | 2.38 HRS | 150.00 | | |
| PERSONAL CARE | 100 | 2.38 HRS | 130.00 | | |
| ⊟TUITION | 1000 | 23.81 HRS | 9,000.00 | | |
| CHILD-ACTIVITIES | 250 | 5.95 HRS | 240.00 | | |
| LUNCHES | 200 | 4.76 HRS | 190.00 | | |
| GROCERIES | 600 | 14.29 HRS | 640.00 | | |
| ETCETERAS | 100 | 2.38 HRS | 110.00 | | |
| TOTAL | $6,935.00 | 165.12 HRS | $18,280.00 94 | TOTAL | $18,570.00 |

TOTAL CURRENT FUNDS    $18,570.00
TOTAL ACCRUED UNSPENT    ($18,280.00)

NET CUSHION (DEFICIT)    $290.00 — 120

⊟THIS ITEM IS A NON-MONTHLY EXPENDITURE

FIG. 10

| SPENDING SOLUTION MADE SOLELY FOR: MR. JOHN SMYTH | | | | | |
|---|---|---|---|---|---|
| FOR THE MONTH: APRIL, 2001 AT APRIL 15, 2001 | | | | | |
| EXPENSES | | | | REVENUES/FUNDS | |
|  | AG | H2O | AU |  | FE |
| SAVE | $1,000.00 | 23.81 HRS | $4,000.00 | BANK | $5,395.00 |
| CREDIT CARD ～224 |  |  | 25.00 | LESS: MINIMUM |  |
| MORTGAGE | 1200 | 28.57 HRS | 0.00 | BALANCE | (1,500.00) |
| HOMEOWNERS DUES | 200 | 4.76 HRS | 0.00 ～250 |  |  |
| ELECTRICITY ～50 | 150 | 3.57 HRS | 60.00 |  |  |
| PHONE ～50 | 60 | 1.43 HRS | 0.00 ～50 AVAILABLE |  |  |
| WATER | 30 | 0.71 HRS | 0.00 | BANK BALANCE | $3,895.00 |
| ⊟ HOME INSURANCE ～52 | 100 | 2.38 HRS | 0.00 ～252 |  |  |
| CABLE TELEVISION | 50 | 1.19 HRS | 50.00 | 100 |  |
| INTERNET SERVICE | 20 | 0.48 HRS | 0.00 |  |  |
| ⊟ TOLL COST | 30 | 0.71 HRS | 40.00 | 4/15/2001 |  |
| LAUNDRY ～54 | 50 | 1.19 HRS | 45.00 | PAYCHECK | 0.00 |
| CAR PAYMENT | 350 | 8.33 HRS | 350.00 ～254 |  |  |
| GAS ～56 | 100 | 2.38 HRS | 100.00 | CASH ～104 | 120.00 |
| ⊟ CAR INSURANCE | 100 | 2.38 HRS | 200.00 ～256 |  |  |
| ⊟ CAR MAINTENANCE | 50 | 1.19 HRS | 200.00 |  |  |
| HEALTH CLUB | 100 | 2.38 HRS | 100.00 | MONEY MARKET | 12,550.00 |
| HAIRCUT | 25 | 0.60 HRS | 25.00 |  |  |
| PRESCRIPTION | 20 | 0.48 HRS | 20.00 |  |  |
| CHARITY | 150 | 3.57 HRS | 220.00 |  |  |
| ⊟ VACATION | 300 | 7.14 HRS | 600.00 |  |  |
| ENTERTAINMENT ～258 | 500 | 11.90 HRS | 230.00 ～258 |  |  |
| CLOTHING | 100 | 2.38 HRS | 150.00 |  |  |
| PERSONAL CARE | 100 | 2.38 HRS | 130.00 |  |  |
| ⊟ TUITION | 1000 | 23.81 HRS | 9,000.00 |  |  |
| CHILD-ACTIVITIES | 250 | 5.95 HRS | 240.00 ～260 |  |  |
| LUNCHES ～260 | 200 | 4.76 HRS | 90.00 |  |  |
| GROCERIES ～262 | 600 | 14.29 HRS | 290.00 ～262 |  |  |
| ETCETERAS | 100 | 2.38 HRS | 110.00 |  |  |
| TOTAL | $6,935.00 | 165.12 HRS | $16,275.00 | TOTAL | $16,565.00 |

TOTAL CURRENT FUNDS  $16,565.00
TOTAL ACCRUED UNSPENT  ($16,275.00)

NET CUSHION (DEFICIT)  $290.00

⊟ THIS ITEM IS A NON-MONTHLY EXPENDITURE

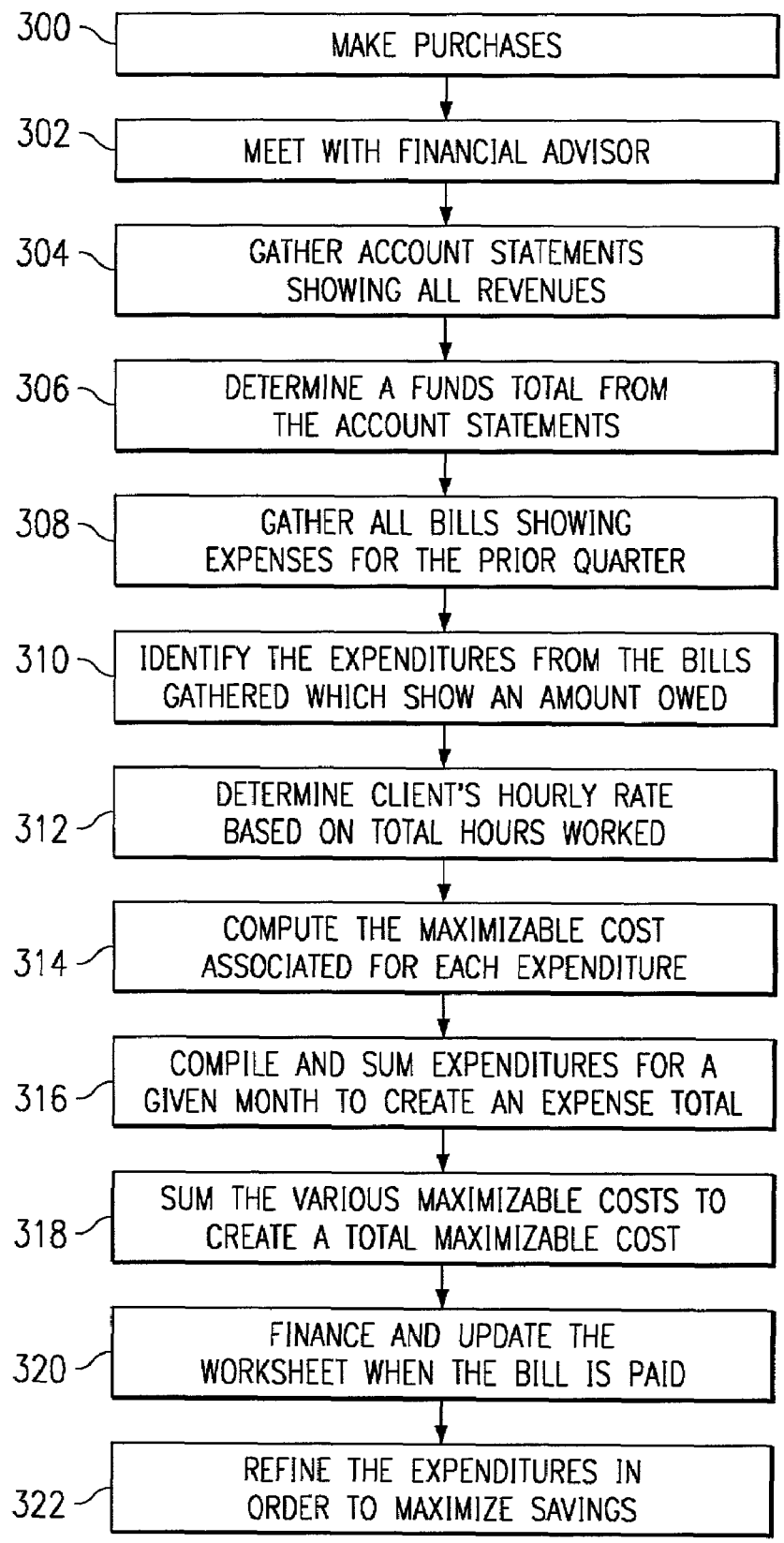

METHOD AND MEDIUM FOR BUDGETING

PARTIAL WAIVER OF COPYRIGHT PURSUANT TO 37 C.F.R. § 1.71

Copyright 2001. Max Jaffe. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

TECHNICAL FIELD OF THE INVENTION

The present invention relates to a method and medium for financial management, and more particularly, but not by way of limitation, to a method and medium for tracking expenditures and revenues.

BACKGROUND OF THE INVENTION

In the modern world of mass commercialization, over consumption has become a way of life. Individuals frequently spend in excess of their financial means which places stress on the individual, the family, as well as the prospects for retirement. Disciplined individuals frequently employ harsh budgeting measures as a means of overcoming their compulsive buying habits and obtaining financial freedom through attaining their financial goals. Unfortunately, the majority of individuals are faced with drifting through life without the assistance of any organized plan for addressing their financial desires. Some individuals, with limited success, create and maintain a rational budgeting scheme that places them on sound financial footing.

Many individuals have limited time and money to spend on addressing these budgeting concerns. The tasks of developing a budget and tracking expenses to maintain this budget are tedious and frustrating experiences. Frequently, individuals or family members often pay bills on a monthly basis, get off their budget, and lose track of the balances outstanding because maintaining such a balanced budget is a cumbersome and time-consuming process. Current systems for assisting individuals in developing budgets fail to address the needs of a person of average financial status. Such systems for keeping records of household accounts and expenditures address complex tax and legal issues excessive to the average individual. Computerized budgeting expenses require that users own and understand how to operate computerized systems and that the user devote a considerable amount of time to learn the computer system and the budgeting applications. This process, particularly on computerized systems, is complicated, time consuming and inefficient. It is also difficult to learn to use efficiently. Thus, the systems fail before they are ever actually employed.

Furthermore, individuals are inherently averse to the complexities of the accounting process as a whole. Current accounting systems perpetuate this dissatisfaction by providing extensive information that may be useful to major corporations, but is wholly inadequate to assist the average individual in determining a realistic budget and maintaining a system to continue with the desired budget. These accounting systems lack a simple and easy-to-use process that is easily understandable and functional to the non-accountant. Also, these systems lack mechanisms to assist individuals in realistically comprehending the budgeting process and the means for obtaining realistic financial objectives.

Moreover, these systems do not assist individuals in adapting a disciplined approach to managing income and expenditures.

Thus, it is apparent that a need exists for a more simplified approach to budgeting finances and maintaining an accounting system whereby an individual can easily track expenditures and revenues and obtain a realistic picture of the individual's financial situation. Such a system is further needed so that the individual can make informed decisions about purchases by realistically associating the purchase decision with the individual's financial capabilities.

SUMMARY OF THE INVENTION

From the foregoing it may be appreciated that a need exists for a simplified method for tracking and budgeting the financial resources of an individual, family or entity.

In accordance with one aspect of the invention, a method is described for budgeting that comprises determining a funds total from one or more income amounts. The method includes determining a funds total from at least an income amount, and identifying an expenditure representing an amount owed; the method further provides for classifying the expenditure as one of a category of a plurality of categories, computing a maximizable cost associated with the expenditure, and generating a cumulative cost associated with the category of the plurality of categories. The method also includes updating the worksheet and updating the income amount.

In a further embodiment of the invention, the expenditure is a plurality of expenditures representing a plurality of amounts owed. The expenditures are summed to create an expenditure total. The maximizable cost is a plurality of maximizable costs that are summed to create a total maximizable cost. The cumulative cost is a plurality of cumulative costs that are summed to create a total cumulative cost. The method provides for updating the expenditure by initializing the amount owed associated with the expenditure, and updating the maximizable cost associated with the expenditure. The method for updating the expenditure further includes updating the cumulative cost associated with the expenditure, updating the expenditure total, updating the total maximizable cost and updating the total cumulative cost.

In an additional embodiment, the method provides for determining the funds total by determining the income amount at a predetermined time, determining an available bank balance at a predetermined time. The funds total is determined by summing the income amount, the available bank balance and the subaccount. The method further provides for determining the available bank balance by determining a bank account balance and subtracting any minimum balance. The subaccount is selected from a group of subaccounts that consist of a financial account, a money market account, a checking account, a savings account, a passbook account, an ATM (automatic teller machine) account and a cash account.

In another embodiment, the method provides for updating the expenditure by updating the bank account, updating the subaccount and updating the funds total. The income amount is updated as the income is received by deducting the income amount and increasing the bank account balance by the income amount. The method provides for updating the subaccount by determining the balance of the subaccounts.

In one embodiment, the expenditure is funded by increasing a balance owed on the Credit Card. The Credit Card is increased by identifying a credit card charge, identifying a date of the credit card charge, describing the credit card charge, identifying the credit card paid, annotating the credit card charge paid and tracking a credit card balance by summing the credit card charge and subtracting the payment amount.

In another embodiment, the expenditure is fundable by deducting the subaccount by the expenditure amount. In a further embodiment, the method provides for computing the maximizable cost by determining a total number of hours worked in a period, determining a salary for the given period, dividing the salary by the total number of hours worked in the period to obtain a maximizable factor. The maximizable cost is determined by dividing the expenditure by the maximizable factor.

In another embodiment, the method provides for generating the cumulative cost by determining the initial budget for the category, adding the initial budget to the cumulative cost, determining an amount owed for the category and subtracting the amount owed from the initial budget for the category. In an additional embodiment, funding the expenditure is annotated by using a double entry system.

In accordance with another aspect of the invention, a computer readable medium is described for budgeting. The computer readable medium comprises a processor programmed to determine a funds total from one or more income amounts. The processor is further programmed to determine a funds total from at least an income amount, identify an expenditure representing a predetermined amount and classify the expenditure as one of a category of a plurality of categories, compute a maximizable cost associated with the expenditure, generate a cumulative cost associated with the category of the plurality of categories, fund the expenditure, update the expenditure and income amount. The computer readable medium can be implemented as a spreadsheet.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 1 is a worksheet according to one embodiment of a method for budgeting provided with an expense portion and a revenue portion at a first period;

FIG. 2 is a housing costs report according to one embodiment of the present for determining a housing cost;

FIG. 3 is a personality cost report according to one embodiment of the present for determining a personality cost;

FIG. 4 is a child cost report according to one embodiment of the present for determining a child cost;

FIG. 5 is a saving report for determining a savings plan associated with a monthly take home pay;

FIG. 6 is a convenience expense report for determining a convenience of money amount;

FIG. 8 illustrates the worksheet described in FIG. 1 at a second period updated in accordance with one embodiment of the present invention;

FIG. 9 illustrates the worksheet described in FIG. 8 at a third period shown updated in accordance with one embodiment of the present invention;

FIG. 10 illustrates the worksheet described in FIG. 9 at a fourth period updated in accordance with one embodiment of the present invention;

FIG. 11 is a flow chart that illustrates a method for budgeting in accordance with one embodiment of the present invention.

DETAILED DESCRIPTION OF THE INVENTION

Figure 7:
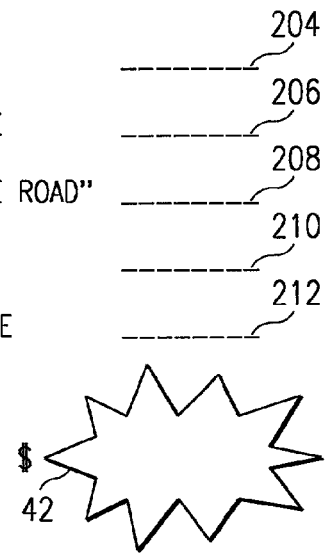
FIG. 7 is a maximizable factor worksheet for determining a maximizable factor according to one embodiment of the present.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

FIG. 1 is a view of a worksheet 10 according to one embodiment of the present invention for budgeting finances. The worksheet provides an expense portion 12 and a revenue portion 14. The worksheet 10 presents a simplified and innovative system for displaying information necessary for determining one's financial situation and creating an appropriate budget. The expense portion 12 of the worksheet 10 includes a first column 16 detailing at least an expenditure 18 and may include a plurality of expenditures 18.

The expenditures 18 represent expenses commonly incurred by individuals that must be addressed for financial and budgeting considerations. These expenditures 18 represent predetermined amounts that may be actually owed by the individual for a variety of goods and services or budgeted or anticipated to be owed in the near or distant future. The expenditures 18 may also represent a predetermined amount or estimate or budgeted amount associated with the averaged amount or expected to be owed on the expenditure 18. The expenditures 18 are classified as one of a plurality of categories 20 of expenses 18. The categories 20 may include, but are not limited to categorization as shown in the second column 22 a save, a credit card, a mortgage, a homeowner's dues, an electricity, a phone, a water, a home insurance, a cable television, an Internet service, a toll cost, a laundry, a car payment, a gas, a car insurance, a car maintenance, a health club, a hair cut, a prescription, a charity, a vacation, an entertainment, a clothing, a personal care, a tuition, a child care activities, a lunches, a groceries, and an etceteras category 20. It will be appreciated that a variety of additional categories for expenses which an individual may incur may be included, but for purposes of brevity and clarity, the aforementioned list is sufficient for the purposes herein.

Thus, it is readily apparent that a car payment category 20 is associated with a $350.00 expenditure 18, such that the categories 20 of the second column 22 are associated horizontally with the expenditures 18 in the first column 16. In other words, the categories 20 represent routine monthly expenditures 18 that are generally fixed, estimated, budgeted, or can be readily annotated by a fixed monthly expenditure 18.

The expenditure 18 in the first column 16 represents the initial amount budgeted for a particular category. The first column 16 is labeled AG 30, or Allocated Greenback, since it represents the amount of money that is allotted for the particular expenditure 18 for a particular period, such as month. It is notable that the worksheet 10 represents a snapshot of the budgeting system at a given period 31, as here on Apr. 1, 2001.

The preparer of the worksheet when creating the budget will determine, perhaps by estimate, the expenditure 18 amount after compiling several months worth of historical data on the expenditure 18 for the various category 20. Various categories 20 are regular monthly expenses where the amount does not vary from month to month. For instance, a mortgage category 20 will remain static for a fixed period of time. Other examples of regularly occurring monthly expenditures 18 will be readily apparent. Various categories are, however, dynamic and the expenditure 18 amount for the category 20 will be determined by averaging several prior months worth of the expenditure 18 for that particular category 20.

As an example, this is accomplished by averaging several months worth of previous expenditures 18 by summing the total for the previous months worth of expenditures 18 for the category 20 and thereafter dividing the sum by the number of months or periods summed to arrive at an initial budgeted amount for the category 20. This budgeted amount is then initialized in the expenditure 18 associated with the category 20. This estimated expenditure 18 for a given period may be derived in a variety of other manners which will be readily apparent to one of ordinary skill in the art in view of the present invention.

Additionally, the expenditure 18 for a category 20 may be a non-reoccurring, or periodic, expense. Examples of non-monthly expenditures 18 paid on an other than monthly basis, such as quarterly, semi-annually, or annually, are categories 20 such as, but not limited to, car insurance, car maintenance, vacation, and tuition which are paid less frequently or as one-time expenses as they are incurred.

A third column 32 represents the amount of time spent by the individual working to pay for the particular expenditure 18 associated with a category 20. The third column 32 is labeled H2O 34, or Hours to Obtain, which represents the total number of hours the individual must spend working at a given hourly rate to pay for the specific expenditure 18 associated with a particular category 20. Therefore, each expenditure 18 associated with a category 20 has a maximizable cost 40 horizontally aligned in the third column 32 with the expenditure 18 of a particular category 20. The maximizable cost 40 presents one advantage of the present embodiment since it allows the individual to readily visualize and rationalize the number of hours the individual spends to pay for a particular expenditure 18 relative to other expenditures 18. In this manner, the individual can easily determine and weigh the advantages of a particular expenditure 18 and its benefit to the individual relative to the other expenditures 18 in the individual's budget. This is advantageous since individuals frequently have fixed costs and are unaware of the relationship of those costs to the whole of their budget, in other words, they are able to see the effect of the expenditure 18 relative to the full depiction of the budget.

The maximizable cost 40 associated with each expenditure 18 will represent a unique hourly number associated with the expenditure 18. The maximizable cost 40 is determined by computing a maximizable factor 42 which will be discussed hereinafter in greater detail with respect to FIG. 7.

A fourth column 44 labeled AU 46, Accrued Unspent, represents a cumulative cost 48 associated with each expenditure 18 and category 20. The cumulative cost 48 is associated horizontally along the worksheet 10 with a particular expenditure 18. The cumulative cost 48 represents an account balance relative to the amount budgeted for the particular category 20 and the budget set for the expenditure 18 of that category 20. Hence, the cumulative cost 48 is formulated by adding the initial amount budgeted for the expenditure 18 of a particular category 20 to the cumulative cost 48. Thus, for example, where the category 20 represents a phone 50 in the second column 22, the associated expenditure 18 is a $60.00 amount 52 which was budgeted for the phone 50 category 20. The cumulative cost 48 associated therewith is then initialized with the $60.00 amount 52. The worksheet 10 will frequently contain categories 20 wherein the expenditure 18 and the cumulative cost 48 are identical amounts in this event, for example, fixed expenses such as mortgage or rent payment.

However, at other instances, the amount actually paid for a particular category 20 differs from the amount actually budgeted for the expenditure 18 of that category 20. After the expenditure is paid, the amount actually paid for the category 20 is subtracted from the cumulative cost 48 which was previously added for that category 20.

Frequently, amounts such as a car insurance 60 are paid less frequently than, for example, on a monthly basis and the present invention provides a unique method for addressing such budget items. To appropriately budget for such amounts, a $100.00 amount 62 is budgeted for the expenditure 18. At the end of a particular period when the car insurance 60 is not actually paid the budgeted amount for the expenditure 18 continues to be added, at the beginning of each period, to the cumulative cost 48 for that particular category 20. In this manner, the cumulative cost represents pockets of money. This allows amounts budgeted for a particular expenditure 18 to accrue to address the budgeted category 20 when the amount must be actually paid at some date in the future. Therefore, after a second period, the $100.00 amount 62 budgeted for the car insurance 60 would continue to accrue to a $200.00 amount 64 unspent for the category 20.

Another advantage of the present invention allows for the individual to easily budget for non-monthly expenditures by providing a cumulative cost representing an accrued and unspent amount for a particular category 20. This allows the individual to maintain a consistent budget while preparing for upcoming, non-monthly, expenditures. Thus, for example, the car insurance 60 category 20 would continue to accrue after six periods to an amount in the associated cumulative cost 48 to $600.00 which might be payable on a semi-annual basis for the car insurance 60. Upon payment of the $600.00 amount for the semi-annual payment of the car insurance 60, the payment amount would be deducted from the current balance in the cumulative cost 48 for the category 20 which would then bring the cumulative cost 48 to a zero balance, in this example.

Additionally, budgeting the initial expenditure 18 may include budgeting for extraordinary expenses or one-time payments, such as, but not limited to, tuition, down-payments on house, automobile purchases, or vacations. In this manner, the present invention provides the additional advantage of enabling the individual to budget, for example, a tuition 66 category 20 with a cumulative cost 48 in an amount of $9,000.00 67 for which the individual anticipates. The method of the present invention allows the individual to initially budget these amounts and initialize the expenditure 18 with a $1,000.00 amount 68 associated with the tuition 66. This results, for example after nine monthly periods, in an accumulation in the cumulative cost 48 associated with the tuition 66 of the $9,000.00 amount 67. Similar and additional budgeted items can be handled in this manner and will be readily apparent to one of ordinary skill in the art in light of the invention disclosed herein.

In certain instances, such as a clothing 70 category 20 where a $100.00 amount 72 is budgeted for the expenditure 18, the actual amount paid for the category 20 will vary from that actually budgeted for that expenditure 18. In the event only $50.00 is actually spent on the clothing 70 category 20, the $100.00 amount 72 budgeted for the expenditure 18 would continue to accrue in the cumulative cost 48 amount.

Thus, after two periods the cumulative cost 48 would aggregate to $200.00, less the amounts actually spent, or, $50.00, and represent a $150.00 amount 74 remaining in the cumulative cost 48 for the clothing 70 category 20.

This provides an additional advantage of the present invention in that the accrued unspent amounts do not become part of a monthly windfall and instead continue to accrue for the category 20 into the next period. This advantage builds in a compensating factor for items such as, but not limited to, utilities and clothing, which are not evenly spread throughout the year, or items paid on a basis other than monthly. Thus, it will be readily appreciated that the present invention adds greater budgeting stability and honesty since the individual budgets a particular amount for an expenditure 18 and is forced to spend that amount on the worksheet 10 even though that amount may not be actually expended from the individual's budget. This advantage ensures that an individual who has budgeted an appropriate amount for a particular category 20 will have the resources available for that category 20 while removing the temptation to spend any windfalls or savings for a particular category 20.

The first, third, and fourth columns 16, 32, and 48 respectively, are individually totaled by summing the respective columns to produce an expenditure total 90, a maximizable cost total 92, and a cumulative cost total 94 associated with each of the columns 16, 32, and 48.

The revenue portion 14 of the worksheet 10 includes revenue and funds information relevant to the individual to track available monies and income sources. The revenue portion includes, in this embodiment, an available bank balance 100, a paycheck 102, a cash 104, and a money market 106. It will be appreciated that the revenue portion 14 of the worksheet 10 may also include a variety of accounts, such as, but not limited to, interest bearing checking accounts, pass book and other savings accounts, cash on hand, CDs, and other similar financial institution products, as well as a variety of income sources such as, but not limited to, rental property income, trust income, royalty income, social security income, disability income, multiple paychecks, and any other sources of income which are well known in the art and will not be detailed for purposes of brevity.

The available bank balance 100 is obtained by determining an actual bank balance 110 and deducting, where applicable, a minimum balance 112 to compute the available bank balance 100. This provides an additional advantage of the present invention in that where the individual derives an economic benefit from maintaining an agreed upon minimum balance in a particular account used by the individual, this minimum balance is deducted to prevent additional banking charges or fees. These fees are typically penalties that are a source of economic waste in an individual's budget.

Again, from the individual's perspective, the available bank balance 100 represents an amount considerably lower than the actual amount of funds maintained in the account of the bank 110. This advantage of the present invention allows the individual to maximize these funds by not incurring penalties, as well as, providing, where applicable, access to additional funds which may be necessary in extraordinary circumstances. The revenue portion 14 of the worksheet 10 is summed and provided with a funds total 114 representing the total available funds for budgeting purposes. A net cushion 120 is derived by subtracting the cumulative cost total 94 from the funds total 114 and gives the individual a summary of the individual's current budgetary standing.

It will be appreciated that the worksheet 10 of the present invention provides an easily understandable view of an individual's budget by advantageously providing both the expense portion 12 and the revenue portion 14 in a single view. The innovative budgeting system of the current embodiment allows an individual to easily create the worksheet 10 including the arrangement of the expense portion 12 and revenue portion 14 in a straight-forward and understandable manner. It will be appreciated, however, that the budgeting system of the present invention, as previously discussed, includes unique and innovative features for developing and maintaining an accurate budget to enable the individual to better manage and achieve the individual's budgeting objectives.

Additional advantages include providing a symbol 130 which is disposed adjacent the category 20 on the worksheet 10 and identifies the adjacent category 20 as a non-monthly expenditure in the budget. This is advantageous in that it provides the individual an opportunity to readily ascertain the individual's progress and ability to fund these non-monthly expenditures by viewing the expenditure 18 associated with the category 20, as well as, the cumulative cost 48 to ascertain the accrued and unspent funds for the category 20.

It will appreciated that the present invention may be employed on a variety of mediums including on paper as worksheets, as well as, as a computerized spreadsheet. In one embodiment (not shown) the present invention is employed as a computerized spreadsheet including cell-based programs utilizing the above-mentioned capabilities for retaining the categories 20, the associated expenditures 18, with the cells programmed to compute the maximizable cost 40 and cumulative cost 48 associated with each of the categories 20. In this manner, it will be readily apparent to one of ordinary skill in the art that the summing and totaling of the expenditure total 90, maximizable cost total 92, cumulative cost total 94, funds total 114, and net cushion 120 may be easily derived utilizing such a system.

Furthermore, the present invention may be employed as a stand-alone computer program providing the same functionality and operate or exist on a computer readable medium. Also, the present invention may be utilized as a combination of paper worksheets and computerized spreadsheets or computer programs when used in combination to provide the method for budgeting as previously disclosed above with reference to FIG. 1. It will be appreciated that while additional worksheets and reports are hereafter disclosed and utilized for the purposes herein as a unitary method and system for budgeting, these worksheets and reports may be used independently or by combining various worksheets and reports with other worksheets and reports to achieve the results and obtain the advantages of the present invention.

FIG. 2 illustrates a housing costs report 150 provided according to one embodiment of the present invention for determining a housing cost total 152. The housing costs report 150 is provided with a plurality of expense items 154, such as mortgage or rent, which are related to housing expenses. Although a variety of possible expenses are listed, other housing related expenses may be included for the purposes herein and will be readily apparent to one of ordinary skill in the art.

The housing cost total 152 is obtained by adding the plurality of housing expenses 154. By utilizing the maximizable factor 42, which will be discussed in greater detail with reference to FIG. 7, the individual can obtain a maximizable cost 40 relative to the housing cost total 152. This achieved by dividing the housing cost total 152 by the maximizable factor 42 and provides the individual an opportunity to visualize housing costs relative to the budget as a whole.

FIG. 3 illustrates a personality cost report 160 which includes a plurality of personality expenses 162. The personality expenses 162 on the personality cost report 160 may be ascertained and categorized in a variety of manners depending upon the circumstances of the individual, the personality costs incurred by the individual, and the most simplified and organized means of formatting personality costs to assist the individual for these purposes. The personality costs can be totaled similar to the housing cost report 150 and the maximizable factor 42 applied similarly for the purposes of providing the individual with the actual costs of the personality expenses 162 relative to the budget as a whole.

FIG. 4 illustrates a child cost report 170 which details a plurality of child related expenses 172. Similar to the personality cost report 160, the child cost report 170 may be customized as appropriate depending upon the child related expenses 172 incurred by the individual for budgeting purposes. Similarly, the format of the child cost report may be modified so as to be customizable to maximize the simplicity and usefulness of the child cost report 170 for budgeting purposes. Similar to the housing cost report 150 (See FIG. 2) the child cost report 170 may compute totals and may be divided by the maximizable factor 42 for the purpose of providing the individual with the impact of child care related expenses 172 as a whole relative to the individual's budget.

FIG. 5 is a savings report 180 which provides a useful method for developing savings plan. The savings report 180 provides for a plurality of savings plans 182 which are computed by determining a monthly income amount 184, such as monthly take home pay, and obtaining the percentage relative to the savings plan 182 desired. By developing the savings plan, the user can visualize a savings goal and aspire towards that goal.

FIG. 6 is a convenience expense report 190 which provides a useful method for determining the expense of a convenience of money. The convenience expense report 190 is provided with a plurality of cash expense items 192 which may include, for example, cash related out-of-pocket expenses frequently incurred by individuals on a daily basis such as beverages, and other snack items purchased from vending machines and other incidental cash expenses routinely incurred. By generating a total 194 which includes the sum of all of the cash expense items 192 incurred in a week end multiplying the total 194 by 52 weeks, representing one full year, an annual cost 196 for such cash expenses can be ascertained. The cash expense report 190 provides a useful method to allow individuals to readily identify the impact of incidental cash related expenses on the individual's budget as a whole for the purposes of minimizing such expenses and maximizing the savings.

FIG. 7 is a maximizable factor worksheet 200 for determining the individual's maximizable factor 42. To determine the maximizable factor 42, a net salary 202 must first be obtained. An hours at the office 204 are ascertained, and where applicable an hours at home 206 and an hours on the road worked 208 are also included. The totals for the working hours 204, 206 and 208 are summed to create a weekly hours total 210. The weekly hours total is multiplied by 52 to obtain an annualized hours worked. The maximizable factor is obtained by dividing the net salary 202 by the annualized hours worked 212. The maximizable factor is an innovative, analytical tool to assist an individual, from a budgetary standpoint, in evaluating one's financial situation and used relative to the budget as a whole for analysis throughout the present invention.

FIG. 8 illustrates the worksheet 10 described in FIG. 1 at a second period 220, in this example Apr. 2, 2001, which represents budgeting transactions that have had an impact on the worksheet 10 at the second period 220. Specifically, an Internet service 222 was funded by a credit card 224. It will be appreciated that typically, while the expenses represented by the expenditures 18 will be funded from accounts and sources typically represented on the revenue portion 14 of the worksheet 10, additional sources of funding for the expenditures 18, such as the credit card 224, may also exist as a source for these purposes. Other such sources of funding may include revolving charge accounts, lines of credit, bank loans and other similar loan products.

Thus, the cumulative cost 48 associated with the credit card 224 increases by $20.00 from $630.00 (See FIG. 1) to $650.00. Appropriately, the cumulative cost 48 associated with the Internet service 222 decreases by $20.00 to $0.00. Therefore, the cumulative cost total 94 is unchanged by these entries. Moreover, the credit card 224 is simply another expense category 20 which will eventually need to be paid by a fund source on the revenue portion 14 of the worksheet 10. Thus, an additional advantage of the present invention as provided in the current embodiment illustrates a real-time running balance of an individual's expenses and revenues and their impact on the budget as a whole.

FIG. 9 illustrates the worksheet 10, substantially shown in FIG. 8, at a third period 230, specifically Apr. 3, 2001. By the third period 230, two additional transactions have occurred. A mortgage 232 was paid as evidenced by the decrease in the cumulative cost 48 associated with the mortgage 232. In this manner, $1,200.00 was deducted from the cumulative cost 48 associated with the mortgage 232 resulting in the cumulative cost 48 associated with the mortgage 232 having a $0.00 balance. Additionally, a homeowner's dues 234 was paid in the same manner and with the same result on the cumulative cost 48 associated with the homeowner's dues 234. Both the mortgage 232 and homeowner's dues 234 were funded from the actual bank balance 110 which resulted in an adjustment to the available bank balance 100 being reduced by $1,400.00.

Since these expenses were funded from the revenue portion 14 of the worksheet 10, the cumulative cost total 94 is changed, but the net cushion 120 remains unchanged. It will be appreciated that the method of updating both the expense portion 12 and revenue portion 14 utilizes a double-entry system which is a further advantage of the present invention. However, even if the expenses were funded by a credit card, the double-entry system would be utilized.

Referring now to FIG. 10, the worksheet 10 substantially shown in FIG. 9 is illustrated. Expenditures 18 which were funded and resulted in an update to the worksheet 10 include an electricity 250, the phone 50, a water 252, a laundry 254, a gas 256 and entertainment 258, a lunches 260, and a groceries 262. The electricity 250 was funded in an amount of $130.00 and resulted in a cumulative cost 48 associated with the electricity 250 of $60.00. The cumulative cost 48 is computed by deducting any amounts paid from the current balance of the cumulative cost 48 for that category 20. In this manner, the $130.00 payment was deducted from the cumulative cost 48 of $190.00 (See FIG. 9) resulting in the current $60.00 figure.

The electricity 250 was funded from the actual bank balance 100 and thus resulted in an increase of the cumulative cost 48 associated with the credit card 224 of $130.00. The phone 50 was paid in an amount of $60.00 by the actual bank balance 110 resulting in a decrease of the bank balance 110 by that amount. Additional payments made by the actual bank balance 110 include the home insurance 252 in an amount of $300.00 and resulted in similar entries. The laundry 252 was paid by the cash 104 in an amount of $30.00 and updated accordingly. Thus, the cumulative cost 48 associated with the laundry 254 was reduced by $30.00 and the cash 104 was similarly reduced. Additional entries represented on the current worksheet include the gas 256 in an amount of $30.00 which was funded by the credit card 224, the entertainment 258 in an amount of $350.00 was similarly funded by the credit card 224. Additionally, the lunches 260 were funded in an amount of $100.00 by the cash 104 and the groceries 262 in an amount of $350.00 funded by the credit card 224.

Additional transactions which the budgeting system is adapted to address include ATM (Automatic Teller Machine) withdrawals. In the present worksheet, additional transactions not readily perceivable include two separate $100.00 cash withdrawals made from the ATM, the first on April $4^{th}$ and the second on April 14. Additionally, the credit card 224 was paid in full from the actual bank balance 110 in an amount of $1,355.00.

Referring to the revenue portion 14 of the worksheet 10, the cash 104 which was originally $50.00 on April $3^{rd}$, was adjusted by a $200.00 increase, but the subsequent expenses decreased by $130.00 resulting in a balance of cash 104 in an amount of $120.00. The paycheck 102 was accrued such that the paycheck 102 was decreased by $3,500.00 and the actual bank balance 110 was increased by $3,500.00. Thus, after the payment of various expenses, the available bank balance 110 is $3,895.00.

FIG. 11 is a flow chart according to one embodiment of the present invention and provides a method for budgeting. The method for budgeting includes, at a block 300, making purchases or receiving bills or expenses representing predetermined amounts. This may include, as previously discussed, items such as ATM withdrawals, out-of-pocket cash expenses, ordinary daily expenses such as groceries and fuel purchases, or other regularly occurring bills and expenses. Over a period of time, the individual develops a spending history or track record of spending patterns which is useful to ascertain for budgeting purposes. At a block 302, the individual may meet with a financial advisor, or other budgeting professionals, or in one embodiment of the present invention may utilize the system and method provided and disclosed herein without the assistance of others on, for example, a computer system.

At a block 304, the individual gathers account statement information detailing records of revenues, earnings and expenses. At a block 306, the individual determines the funds total 114 as previously described and shown herein. The funds total 114 details a summary of the individual's revenues and earnings. At a block 308, the individual obtains a listing of bills, statements, and receipts that show expenses for, optimally, the prior quarter of the year. The purpose for obtaining records for a prior quarter is to obtain an accurate monthly average for the purposes of generating the expenditure 18 for each of the categories 20 so as to appropriately estimate a correct amount to budget for the expenditure 18.

At a block 310, the individual identifies the expenditures 18 and classifies the expenditures as one of a plurality of categories 20. When the present invention is implemented on a paper system, this would include keeping a record, for example, on spreadsheet type paper of all of the expenditures 18 categorized 20 substantially as shown and described with reference to the worksheet 10 in FIG. 1.

At a block 312, the individual determines the individual's hourly rate based upon the total hours worked and computes the maximizable factor 42. At a block 314, the maximizable factor 42 is computed for each expenditure 18 relative to an associated category 20. This computation provides an opportunity to view the cost of each expenditure 18 in terms of the work hours required for the individual to pay for a specific expenditure 18. At a block 316, the expenditures 18 for a given period are summed to create an expenditure total 90.

At a block 318, the maximizable cost 40 are summed to create a maximizable cost total 92. At a block 320 the expenditures 18 are funded from various sources such as, but not limited to, the actual bank balance 110, cash 104, money market 106, or may be funded from other sources such as the credit card 224. The worksheet 10 is then updated to indicate that the expenditure 18 has been so funded. At a block 322, the expenditure 18 is evaluated in order to maximize the savings on the specific expenditure 18 for the category 20.

The process of refining the expenditures is a continual budgeting process to ensure optimum use of the financial resources to achieve the maximum savings potential. As with any budgeting system, the present invention will continue to require manipulation, for example, of the expense portion 12 and the revenue portion 14, more specifically of the individual expenditures 18, categories 20, maximizable costs 40, and cumulative costs 48 so as to continually keep the individual apprized of the current financial situation for budgeting purchases.

In one embodiment of the present invention, a method for budgeting is provided which includes providing the worksheet 10 including an arrangement of the funds total 114 of the revenue portion 14 and the expenditure 18, maximizable cost 40, and the cumulative cost 48 of the expense portion 12. The method includes determining the funds total 114 from at least an income source, such as the paycheck 102. The method includes identifying the expenditures 18 representing a predetermined amount and classifying the expenditures 18 as one of a plurality of categories 20 associated with the expenditure 18. The method further provides for computing the maximizable cost 40 associated with the expenditure 18. The method further provides for generating the cumulative cost 48 associated with the category 20. The method further provides for updating the worksheet by updating, when appropriate, the income amounts, such as the paycheck 102, and the expenditures 18 as such expenditure 18 are funded from the budget by the individual.

Thus, it is apparent that there has been provided, in accordance with the present invention, a competitive bidding medium and method that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various embodiments shown in the drawings herein illustrate that the present invention may be implemented and embodied in a variety of different ways that still fall within the scope of the present invention.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

What is claimed is:

1. A method for maintaining an account over a plurality of periods using a reverse budget implemented on a computer, wherein the account includes an available account balance derived from one or more revenue sources and a plurality of expenditures, comprising:

adding an income amount from the one or more revenue sources to the available account balance;

grouping each of the plurality of expenditures into one of a plurality of categories, wherein each of the plurality of expenditures is grouped into one of the plurality of categories based on a type of expenditure;

specifying a budget amount for each of the plurality of categories, wherein the budget amount represents an amount that a sum of the plurality of expenditures in the respective category should not exceed during any one of the plurality of periods;

calculating a remaining balance for each of the plurality of categories, wherein each remaining balance is calculated by adding the budget amount in the respective category at the beginning of each of the plurality of periods and then subtracting a sum of the plurality of expenditures grouped into the respective category during the respective period;

calculating a cost associated with each of the plurality of expenditures, wherein the cost represents a total number of hours a user must spend working at a pay rate to pay for the respective expenditure during the respective period;

outputting the available account balance, the cost and the remaining balance for at least one of the plurality of categories to the user; and revising at least one selected from the group consisting of the budget amount of at least one of the plurality of categories and one or more of the plurality of expenditures of at least one of the plurality of categories based on the available account balance, the cost, and the remaining balance for at least one of the plurality of categories.

2. The method of claim 1, wherein the plurality of expenditures represent a plurality of predetermined amounts.

3. The method of claim 2, further comprising summing the plurality of expenditures to create an expenditure total.

4. The method of claim 2, further comprising summing the budget amount for each of the plurality of categories to create a total budget amount.

5. The method of claim 4, further comprising determining the available account balance of at least one of the one or more revenue sources, wherein determining the available account balance includes:
   determining a subaccount amount at a predetermined time; and
   summing the available account balance and the subaccount amount.

6. The method of claim 5, wherein a determination of the available account balance further includes:
   determining a bank account balance; and
   subtracting a minimum balance.

7. The method of claim 5, wherein the plurality of categories are selected from the group consisting of a Save, a Credit Card, a Mortgage, a Rent, a Homeowners Dues, an Electricity, a Phone, a Water, a Home Insurance, a Cable Television, an Internet Service, a Toll Cost, a Laundry, a Car Payment, a Gas, a Car Insurance, a Car Maintenance, a Health Club, a Haircut, a Prescription, a Charity, a Vacation, an Entertainment, a Clothing, a Personal Care, a Tuition, a Child Activities, a Meals, a Groceries and a Miscellaneous.

8. The method of claim 7, wherein the method is implemented using a computerized spreadsheet.

9. The method of claim 1, wherein calculating the cost comprises:
   determining a total number of hours worked by the user in a specified period of time;
   determining a salary for the user in the specified period of time;
   dividing the salary for the specified period of time by the total number of hours worked to obtain a maximizable factor; and
   dividing the respective expenditure by the maximizable factor.

10. The method of claim 1, wherein revising comprises eliminating or reducing one or more of the plurality of expenditures of at least one of the plurality of categories.

11. The method of claim 1, wherein revising comprises reducing or increasing the budget amount of at least one of the plurality of categories.

12. A computer executable program embodied on a computer readable medium for maintaining an account over a plurality of periods using a reverse budget, wherein the account includes an available account balance derived from one or more revenue sources and the plurality of expenditures, comprising:
   a first computer code for adding an income amount from the one or more revenue sources to the available account balance;
   a second computer code for grouping each of the plurality of expenditures into one of a plurality of categories, wherein each expenditure is grouped into one of the plurality of categories based on a type of expenditure;
   a third computer code for specifying a budget amount for each of the plurality of categories, wherein the budget amount represents an amount that a sum of the plurality of expenditures in the respective category should not exceed during any one of the plurality of periods;
   a fourth computer code for calculating a remaining balance for each of the plurality of categories, wherein each remaining balance is calculated by adding the budget amount in the respective category at the beginning of each of the plurality of periods and then subtracting a sum of the plurality of expenditures grouped into the respective category during the respective period;
   a fifth computer code for calculating a cost associated with each of the plurality of expenditures, wherein the cost represents a total number of hours a user must spend working at a pay rate to pay for the respective expenditure; and
   a sixth computer code for outputting the available account balance, the cost and the remaining balance for at least one of the plurality of categories to the user; and
   a seventh computer code for revising at least one selected from the group consisting of the budget amount of at least one of the plurality of categories and one or more of the plurality of expenditures of at least one of the plurality of categories based on the available account balance, the cost, and the remaining balance for at least one of the plurality of categories.

13. The computer executable program of claim 12, wherein the plurality of expenditures represents a plurality of predetermined amounts.

14. The computer executable program of claim 13, further comprising:
   an eighth computer code for summing the plurality of expenditures to create an expenditure total; and
   a ninth computer code for summing the budget amount for each of the plurality of categories to create a total budget amount.

15. The computer executable program of claim 14, wherein the budget amount for each of the plurality of categories initially comprises the expenditures in the respective category.

16. The computer executable program of claim 15, further comprising a tenth computer code for determining an available account balance of at least one of the one or more revenue sources, wherein determining the available account balance includes:
    an eleventh computer code for determining a subaccount amount at a predetermined time; and
    a twelfth computer code for summing the available balance and the subaccount.

17. The computer executable program of claim 16, wherein a determination of the available account balance further includes:
    a thirteenth computer code for determining a bank account balance; and
    a fourteenth computer code for subtracting a minimum balance.

18. The computer executable program of claim 14, wherein the plurality of categories are selected from the group consisting of a Save, a Credit Card, a Mortgage, a Rent, a Homeowners Dues, an Electricity, a Phone, a Water, a Home Insurance, a Cable Television, an Internet Service, a Toll Cost, a Laundry, a Car Payment, a Gas, a Car Insurance, a Car Maintenance, a Health Club, a Haircut, a Prescription, a Charity, a Vacation, an Entertainment, a Clothing, a Personal Care, a Tuition, a Child Activities, a Meals, a Groceries and a Miscellaneous.

19. A system for maintaining an account over a plurality of periods using a reverse budget, wherein the account includes an available account balance derived from one or more revenue sources and the plurality of expenditures, comprising:
    a processor;
    a memory unit coupled to the processor, the memory unit having a computer executable program thereon to:
        add an income amount from the one or more revenue sources to the available account balance;
        group each of the plurality of expenditures into one of a plurality of categories, wherein each of the plurality of expenditures is grouped into one of the plurality of categories based on a type of expenditure;
        specifying a budget amount for each of the plurality of categories, wherein the budget amount represents an amount that a sum of the plurality of expenditures in the respective category should not exceed during any one of the plurality of periods;
        calculate a remaining balance for each of the plurality of categories, wherein each remaining balance is calculated by adding the budget amount in the respective category at the beginning of each of the plurality of periods and then subtracting a sum of the plurality of expenditures grouped into the respective category during the respective period;
        calculate a cost associated with each of the plurality of expenditures, wherein the cost represents a total number of hours a user must spend working at a pay rate to pay for the respective expenditure during the respective period;
        output the available account balance, the cost and the remaining balance for at least one of the plurality of categories to the user; and
    revise at least one selected from the group consisting of the budget amount of at least one of the plurality of categories and one or more of the plurality of expenditures of at least one of the plurality of categories based on the available account balance, the cost and the remaining balance for at least one of the plurality of categories.

20. The system of claim 19, wherein the plurality of expenditures represents a plurality of predetermined amounts.

21. The system of claim 20, wherein the processor is further programmed to:
    sum the plurality of expenditures to create an expenditure total; and
    sum the budget amount for each of the plurality of categories to create a total budget amount.

22. The system of claim 21, wherein the budget amount for each of the plurality of categories initially comprises the expenditures in the respective category.

23. The system of claim 22, wherein the processor is further programmed to determine an available account balance of at least one of the one or more revenue sources, wherein determining the available account balance includes:
    determine a subaccount amount at a predetermined time; and
    sum the available amount balance and the subaccount.

24. The system of claim 23, wherein a determination of the available account balance further includes:
    determine a bank account balance; and
    subtract a minimum balance.

25. The system of claim 21, wherein the plurality of categories are selected from the group consisting of a Save, a Credit Card, a Mortgage, a Rent, a Homeowners Dues, an Electricity, a Phone, a Water, a Home Insurance, a Cable Television, an Internet Service, a Toll Cost, a Laundry, a Car Payment, a Gas, a Car Insurance, a Car Maintenance, a Health Club, a Haircut, a Prescription, a Charity, a Vacation, an Entertainment, a Clothing, a Personal Care, a Tuition, a Child Activities, a Meals, a Groceries and a Miscellaneous.

* * * * *